United States Patent [19]

McCartney et al.

[11] 4,109,062

[45] Aug. 22, 1978

[54] SUBMERSIBLE BATTERY APPARATUS

[75] Inventors: Joseph F. McCartney, Solana Beach; Charles R. Gundersen, San Diego, both of Calif.

[73] Assignee: The United States of America as represented by the Secretary of the Navy, Washington, D.C.

[21] Appl. No.: 835,766

[22] Filed: Sep. 22, 1977

[51] Int. Cl.² ............................................. H01M 14/00
[52] U.S. Cl. .......................................... 429/6; 429/194
[58] Field of Search ..................... 429/6, 194, 196, 218

[56] References Cited

U.S. PATENT DOCUMENTS

| | | | |
|---|---|---|---|
| 3,540,929 | 11/1970 | Carson, Jr. | 429/6 |
| 3,825,444 | 7/1974 | Martin | 429/6 |
| 4,012,234 | 3/1977 | Kraft | 429/6 |

*Primary Examiner*—Charles F. LeFevour

*Attorney, Agent, or Firm*—Richard S. Sciascia; Ervin F. Johnston

[57] ABSTRACT

A submersible battery apparatus is set forth which has improved life and power performance capabilities. The apparatus includes a battery which has top and bottom casing ends with one of tha battery casing ends having an aperture. A housing is provided which also has top and bottom ends. The battery is mounted in the housing with the aperture in the battery casing 10 directed downwardly and facing the bottom end of the housing. The battery contains an electrolyte, and the housing contains a liquid which has a higher specific gravity than the electrolyte and is non-reactive therewith. The housing is pressure compensated so that the power of the battery is increased with increased submergence and yet gases generated by the battery are retained within the battery casing so that they will not corrode the housing and its associated terminals.

15 Claims, 3 Drawing Figures

SUBMERSIBLE BATTERY APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The U.S. Navy has been investigating the lithium-inorganic electrolyte battery for many ocean oriented applications, such as oceanographic instrumentation, sonar systems, biotelemetry devices, undersea weapons and small undersea vehicles. The lithium-inorganic electrolyte battery is desirable because of its high-energy density and long shelf life capabilities. The lithium-inorganic electrolyte battery can be obtained from several companies including GTE Laboratories, P. R. Mallory and Company, Inc., Honeywell, Inc., and Electrochimica Corporation. The electrolyte is composed of inorganic salts (lithium aluminun chloride) in an organic solvent (thionyl chloride). Energy is produced by the electro-chemical decomposition of the inorganic solvent material at a carbon electrode and oxidation of the lithium during discharge of the cell. The cathode is constructed of a high porosity carbon which allows circulation of the catholyte and space for accumulation of reaction products. The inorganic solvent decomposes only when the load circuit is closed, thereby making it possible for the battery to operate effectively for several years.

While the aforementioned lithium battery has a high energy density it has a relatively low current flow rate at atmospheric pressure. However, when ambient pressure is increased, the battery will, for reasons not entirely known, increase its current flow rate correspondingly. A possible explanation for this increased capability with increased pressure is that the electrolyte solution more thoroughly saturates the porous carbon cathode, thereby increasing the effective surface area between the electrolyte and the carbon. This, in turn, would increase the electron exchange between the electrolyte and the carbon cathode resulting in an increase in current flow. Since many of the batteries utilized by the Navy are involved in submerged applications, it would be beneficial to utilize the depth pressure of the water to pressurize the battery and increase the current flow rate. One approach of accomplishing this result is to dispose the lithium battery within a pressure compensated housing which has a liquid interfacing with the electrolyte in the lithium battery through an aperture in the battery casing. Such an approach will result in increased current flow rate of the lithium battery with corresponding increased depth in the water. However, such an approach per se does not overcome the problem of disposition of gases generated by the lithium battery during use. These gases, in particular sulphur dioxide, is very corrosive and, upon contact with the interior surface of the housing and its associated terminals, will result in a short life battery apparatus due to the failure of the components. Accordingly, an approach is needed where the advantages of the pressure compensated apparatus can be obtained, and yet the corrosion of components can be eliminated as the battery generates gases.

SUMMARY OF THE INVENTION

The present invention provides a battery apparatus which will deliver an increased current flow rate with increased pressure, and yet will be free from corrosion of the components due to outgasing of the battery. This has been accomplished by providing a battery which has an aperture in one of its casing ends, and providing a housing which has top and bottom ends. The battery is mounted in the housing with the aperture in the battery casing end directed downwardly and facing the bottom end of the housing. The housing contains a liquid which has a higher specific gravity than the electrolyte in the battery and which is non-reactive therewith. The housing is pressure compensated so that as the battery is submerged to increased depths in the water, the current flow rate of the battery increases correspondingly. Because of the position of the battery within the housing and the relative specific gravities of the liquid in the housing and the electrolyte, all gases generated by the battery are retained within the battery casing so that none of the housing components, including the terminals, are subjected to corrosion.

OBJECTS OF THE INVENTION

An object of the present invention is to provide a submersible battery apparatus which has improved life and power performance.

Another object is to provide a submersible battery apparatus which will have an increased current flow rate capability with increased depth submergence, and yet will be free from corrosion due to outgasing of the battery.

A further object is to provide a lithium-inorganic electrolyte battery apparatus which will have increased current flow rate with increased depth submergence, and yet will not be subjected to corrosion when the battery generates gases.

These and other objects of the invention will become more readily apparent from the ensuing description when taken together with the drawing.

DESCRIPTION OF THE PREFERRED EMBODIMENT

Figure 1:
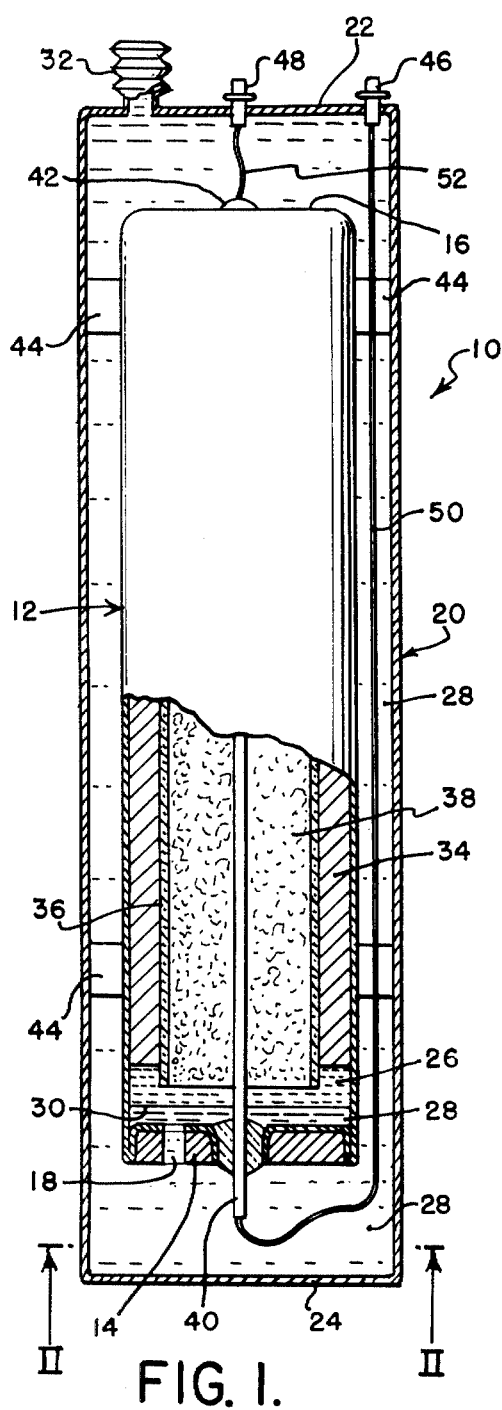
FIG. 1 is a side view of the submersible battery apparatus with portions cut away to show the various details thereof.
Figure 2:
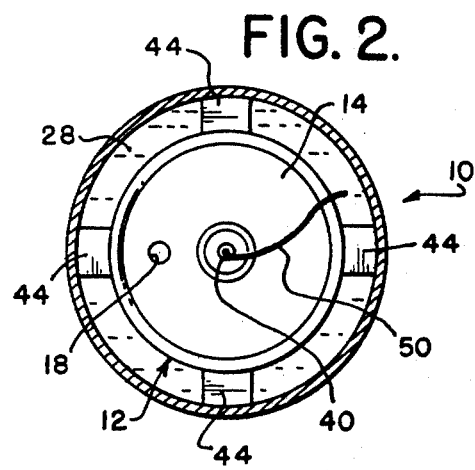
FIG. 2 is a view taken along plane II—II of FIG. 1.

Referring now to the drawing, wherein like reference numerals designate like or similar parts throughout the several views, there is illustrated in FIG. 1 a submersible battery apparatus 10 which has an improved current flow rate due to pressure, and yet is not subject to corrosion by gases generated by the battery. The apparatus 10 includes a battery 12 which has top and bottom casing ends 14 and 16, respectively. One of the battery casing ends, preferably the top casing end 14, has an aperture 18 so as to open the interior of the casing to an outside environment. A housing 20 is provided which also has top and bottom ends 22 and 24, respectively.

A significant structural arrangement of the invention is that the battery 12 is mounted in the housing 20 with the aperture 18 in the battery casing end directed downwardly facing the bottom end 24 of the housing. In this manner, any gases generated by the battery will be retained in the battery casing. Another significant feature of the present invention is that the battery 12 contains a liquid electrolyte 26 and the housing 20 contains a liquid 28 with the liquid 28 having a higher specific gravity than the electrolyte 28 and being non-reactive therewith. The battery 12 is preferably only partially filled with the electrolyte 26 so that the two liquids will interface somewhere within the battery casing, such as at level 30 therein. The housing 20 is pressure compensated by any suitable means such as a bellows 32 which may be located at the top end 22 of the housing. With this arrangement gases generated by the battery 12 are contained within the battery casing and battery power is increased with increased depth pressure due to submergence. The gase generated by the battery 12 will simply rise as bubbles within the battery casing so as to prevent any corrosion of the housing 20.

In a preferred embodiment, the battery is of the lithium-thionyl chloride type. This type of battery may have a lithium anode 34 which coats the interior surface of the battery casing 12. Inward of the lithium anode 34 there may be fiberglass separator 36, and within the separator 36, there may be a bobbin type porous carbon cathode 38. The electrolyte, which may be a solution of thionyl chloride, lithium chloride, and aluminum chloride, will saturate the pores of the carbon bobbin 38. A positive electrode 40 may extend centrally from the carbon bobbin 38, and a negative terminal 42 may be provided at the exterior bottom end 16 of the battery casing. The aperture 18 is preferably made in the top casing end 14 of the battery so that complete saturation is maintained of the carbon bobbin 38. The battery 12 may be concentrically spaced within the housing 20 by any suitable means such as friction fitted inserts 44. The housing 20 may be provided with positive and negative terminals 46 and 48 respectively which may extend through the top end 22 thereof. The positive terminal 40 of the battery 12 is connected to the positive terminal 46 of the housing by a lead 50, and the negative terminal 42 of the battery is connected to the negative terminal 48 of the housing by a lead 52. In this manner, the battery 12 delivers its power exterior of the housing 20 by simply tapping the terminals 46 and 48.

A suitable liquid 28 for interfacing with the battery electrolyte 26 is a flurochemical, such as FC 75. FC 75 is a flurocarbon liquid manufactured by DuPont and has a specific gravity of about 1.6. The above described electrolyte of the thionyl chloride battery 12 has a specific gravity of about 1.4. Accordingly, the lighter electrolyte 26 will remain upwardly within the battery casing so long as the battery apparatus 10 is kept substantially in the position as shown. If it is expected that the battery apparatus 10 will be turned substantially from this position, a one way valve (not shown) could be utilized within the aperture 18 to prevent the escape of the electrolyte 26 therefrom.

Figure 3:
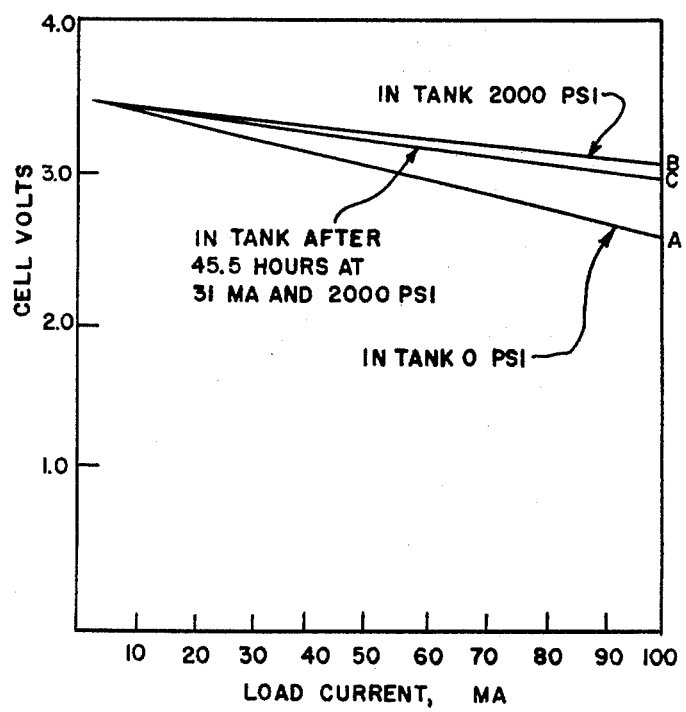
FIG. 3 is a chart illustrating the improved current flow rate of the lithium-inorgainic electrolyte battery with increased pressure thereon.

A test of the above described invention was made in a pressure tank. The results of this test are illustrated in FIG. 3. At pressure of 2,000 psi curve B illustrates the volt-ampere output of the battery at that particular time. The battery was then discharged about 1.5 ampere hours and the volt-ampere curve at 2,000 psi is illustrated at C. The volt-ampere output of the battery at ambient is illustrated at A. The difference between curves A and B can be attributed to the benefits of increased pressure on the battery.

Obviously, many modifications and variations of the present invention are possible in the light of the above teachings, and, it is therefore understood that the invention may be practiced otherwise than as specifically described.

What is claimed is:

1. A submersible battery apparatus with improved current flow rate comprising:
   a battery having top and bottom casing ends, one of the battery casing ends having an aperture,
   a pressure compensated housing having top and bottom ends;
   said battery being mounted in the housing with the aperture in the battery casing end directed downwardly within and facing the bottom end of the housing;
   said battery containing a liquid electrolyte; and
   said housing containing a liquid which has a higher specific gravity than the electrolyte and is non-reactive therewith;
   whereby gases generated by the battery are retained within the battery casing and battery power is increased with increased submergence.

2. A battery apparatus as claimed in claim 1 including:
   the battery having positive and negative terminals;
   the housing having a pair of terminals extending therethrough; and
   a pair of leads interconnecting the positive and negative terminals to the pair of housing terminals.

3. An apparatus as claimed in claim 1 including:
   said liquid being a fluorochemical.

4. An apparatus as claimed in claim 1 including:
   said housing having pressure compensating means; and
   the pressure compensating means being a bellows which is mounted through the top end of the housing.

5. An apparatus as claimed in claim 1 including:
   the battery being of the bobbin type.

6. An apparatus as claimed in claim 1 including:
   said aperture being in the top end of the battery.

7. An apparatus as claimed in claim 6 including:
   the battery being of the bobbin type.

8. A submersible battery apparatus with improved current flow rate comprising:
   a bobbin type battery having top and bottom casing ends, the top casing end of the battery having an aperture;
   a housing having top and bottom ends;
   said battery being in the housing with the aperture in the battery casing end directed downwardly and facing the bottom end of the housing;
   said battery having a lithium anode and a thionyl chloride electrolyte;
   said housing containing a liquid which has a higher specific gravity than the electrolyte and is non-reactive therewith; and
   means mounted to the housing for pressure compensating the housing,
   whereby gases generated by the battery are retained within the battery casing and battery power is increased with increased submergence.

9. An apparatus as claimed in claim 8 including:
   the liquid being a fluorochemical.

10. An apparatus as claimed in claim 9 including:

the pressure compensating means being a a bellows which is mounted through the top end of the housing.

11. A submersible battery apparatus with improved life and power performance comprising:
   a bobbin type battery having top and bottom casing ends;
   the battery having a lithium anode, and a thionyl chloride electrolyte;
   the top casing end of the battery having an aperture;
   a housing having top and bottom ends;
   said battery being mounted in the housing in an inverted position with the aperture in the battery casing end directed downwardly and facing the bottom end of the housing;
   said housing containing a liquid which has a higher specific gravity than the electrolyte and is non-reactive therewith;
   the liquid partially filling the battery through the aperture and interfacing with the electrolyte therein; and
   means mounted to the housing for pressure compensating the housing;
   whereby gases generated by the battery are retained within the battery casing and battery power is increased with increased submergence.

12. An apparatus as claimed in claim 11 including: the battery having a porous carbon cathode.

13. An apparatus as claimed in claim 12 including:
   the battery having positive and negative terminals;
   the housing having a pair of terminals extending therethrough; and
   a pair of leads interconnecting the positive and negative terminals to the pair of housing terminals.

14. An apparatus as claimed in claim 13 including:
   said liquid being a fluorochemical.

15. A submersible battery apparatus with improved current flow rate comprising:
   a battery having top and bottom casing ends, one of the battery casing ends having an aperture,
   a housing having top and bottom ends;
   said battery being mounted in the housing with the aperture in the battery casing end directed downwardly and facing the bottom end of the housing;
   said battery having a lithium anode and a thionyl chloride electrolyte;
   said housing containing a liquid which has a higher specific gravity than the electrolyte and is non-reactive therewith; and
   means mounted to the housing for pressure compensating the housing;
   whereby gases generated by the battery are retained within the battery casing and battery power is increased with increased submergence.

* * * * *